United States Patent [19]
Stucki et al.

[11] 3,942,258
[45] Mar. 9, 1976

[54] EARTH REFERENCE THIN-FILM MAGNETOMETER COMPASS EXHIBITING TOTAL TILT IMMUNITY

[75] Inventors: Frank F. Stucki, Portola Valley; James Herbert, Sunnyvale, both of Calif.

[73] Assignee: The United States of America as represented by the Secretary of the Air Force, Washington, D.C.

[22] Filed: Aug. 21, 1974

[21] Appl. No.: 499,228

[52] U.S. Cl. ............................... 33/361; 324/43 R
[51] Int. Cl.² ........................................ G01C 17/18
[58] Field of Search .............. 33/361, 362; 324/43 R

[56] References Cited
UNITED STATES PATENTS

| 2,847,642 | 8/1958 | Smith | 33/361 X |
|---|---|---|---|
| 3,727,177 | 4/1973 | Fuller et al. | 33/361 |

FOREIGN PATENTS OR APPLICATIONS

| 592,241 | 9/1947 | United Kingdom | 324/43 |

*Primary Examiner*—William D. Martin, Jr.
*Attorney, Agent, or Firm*—Joseph E. Rusz; William Stepanishen

[57] ABSTRACT

A thin film compass apparatus utilizing a plurality of thin film magnetometers arranged in an orthogornal coordinate system to provide an earth reference compass having total tilt immunity.

8 Claims, 9 Drawing Figures

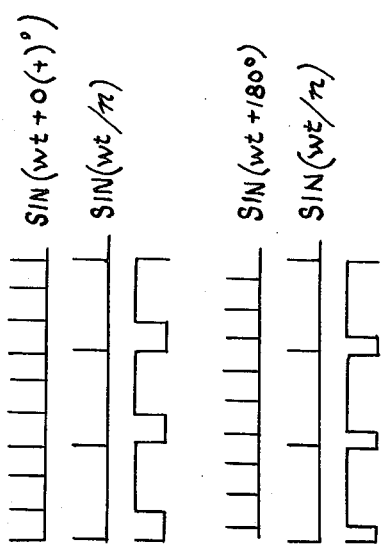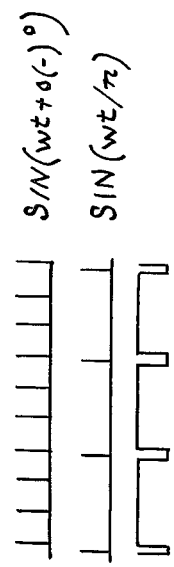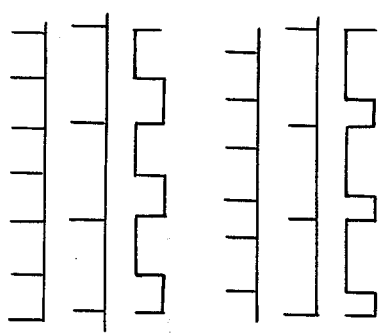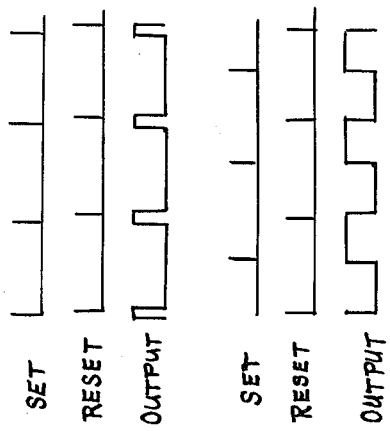
FIG.6A  n=1
FIG.6B  n=2
FIG.6C  n=3

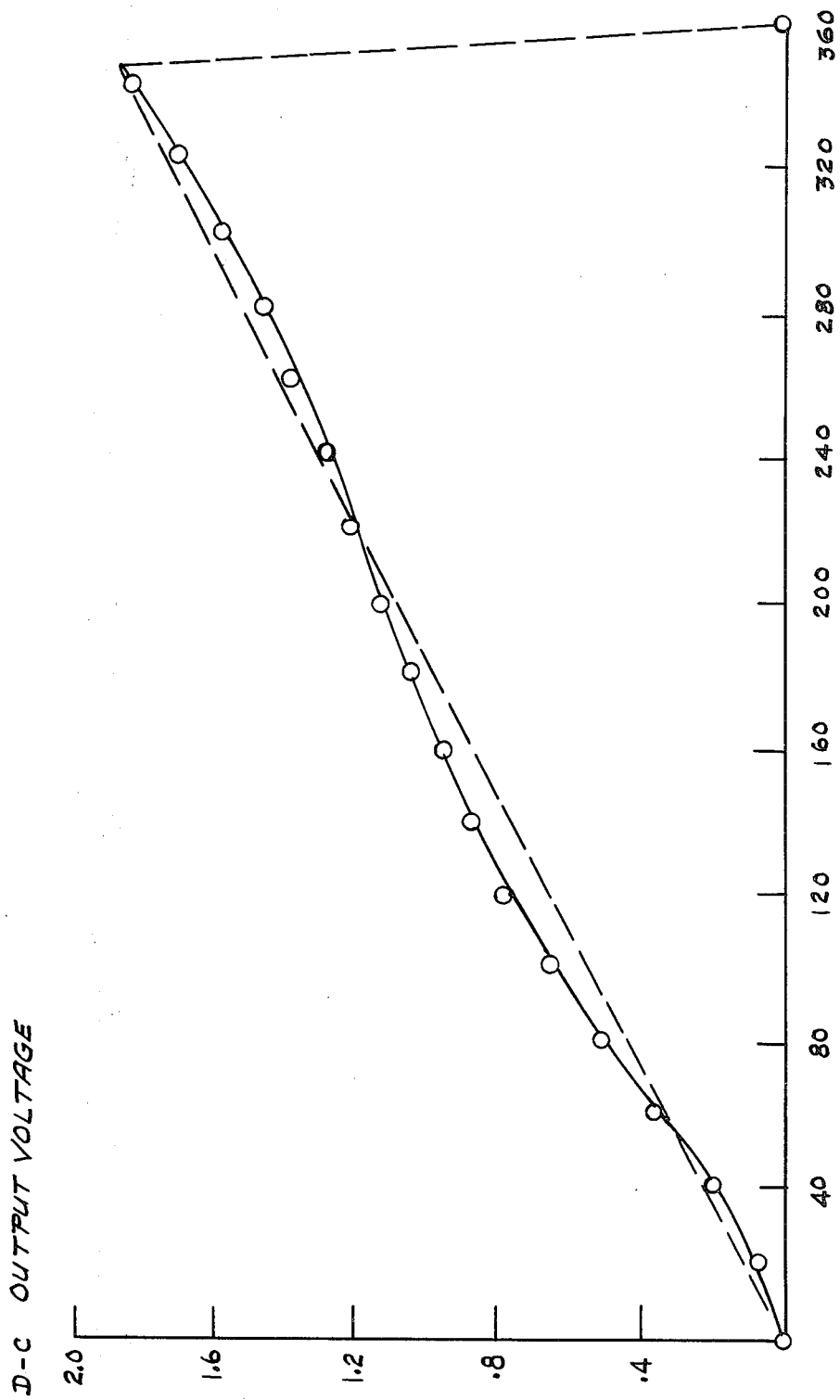

EARTH REFERENCE THIN-FILM MAGNETOMETER COMPASS EXHIBITING TOTAL TILT IMMUNITY

BACKGROUND OF THE INVENTION

The present invention relates broadly to a magnetic reference apparatus, and in particular to a thin-film magnetometer compass.

Thin magnetic films have been produced by depositing a nickel-iron alloy on a smooth substrate to a thickness of a few hundred to several thousand Angstroms. A number of deposition processes, including evaporation in a vacuum and electroplating may be employed. In the evaporative process the deposition of the magnetic material on a glass substrate may be made directly, whereas electroplating on a glass substrate requires the application of a conductive coating on the glass prior to deposition. In general, the characteristics discussed hereinafter apply to films deposited by either of these processes, although in electroplated films consideration must be given to the possible high-frequency eddy-current effects in the required conductive underlayer.

In general, predictable and stable magnetic properties of the films are obtained by choosing an alloy composition which yields minimum magnetostriction coefficient. For the nickel-iron film, the optimum composition appears to be approximately 83% Ni, 17% Fe. It has been found experimentally that if the actual composition of the film differs from this ratio by more than a few percent, the film magnetic properties are unduly sensitive to stresses induced by thermal expansion of the substrate or by external forces.

Films of thicknesses up to at least 3,000 Angstroms exhibit the capability of existing as a single domain, the magnetization of which can be rotated from a preferred or easy direction of magnetization by the application of external fields. This easy axis anisotropy is produced in the films by the presence of a large uniform field during the evaporation process which causes the magnetic domains of the alloy to align in a preferred direction. The magnetic characteristic of thin films in the preferred direction exhibits a substantially rectangular hysteresis loop. In a direction transverse to the easy direction, often referred to as the hard direction or axis, the magnetic characteristic is substantially linear loop.

SUMMARY

The present invention utilizes a thin film magnetometer having three sensors arranged along the X, Y and Z axis of an orthogonal coordinate system. Each of the thin-film sensors comprises a substrate and a Permalloy layer of thin magnetic film deposited upon the substrate. The pumping and output coils are wound around the sensors normal to each other. An A-C current is applied to the pumping coil which induces an A-C voltage at the output coil with the amplitude varying as a function of the magnitude of the earth's magnetic field as projected on the axis of the sensors.

The established sensitivity ranges of the thin film magnetometer fully encompases the magnitude of the earth's magnetic field.

It is therefore a general object of the present invention to provide an improved thin-film magnetometer compass.

It is another object of the invention, therefore, to provide an improved thin-film magnetometer compass apparatus utilizing an orthorgonal coordinate system to provide total tilt immunity.

These and other advantages, objects and features of the invention will become more apparent from the following description taken in connection with the illustrative embodiment in the accompanying drawings.

BRIEF DESCRIPTION OF THE DRAWINGS

FIG. 6a through 6c are graphical representations of the subharmonic reset operation of the flip-flop within the thin-film magnetometer compass, and FIG. 7 is a graphical representation of the calibration curve of the thin-film magnetometer ccompass.

DESCRIPTION OF THE PREFERRED EMBODIMENT

Figure 1:
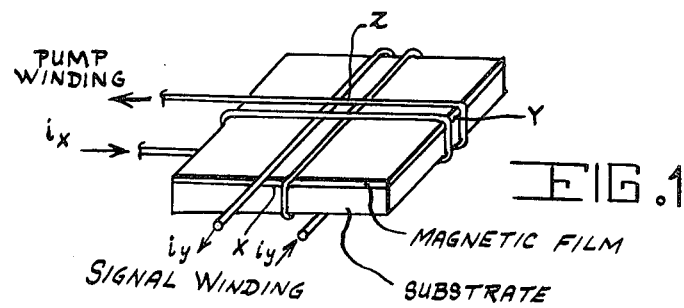
FIG. 1 is a plane view of the thin-film magnetometer illustrating magnetic geometry and windings.
Figure 2:
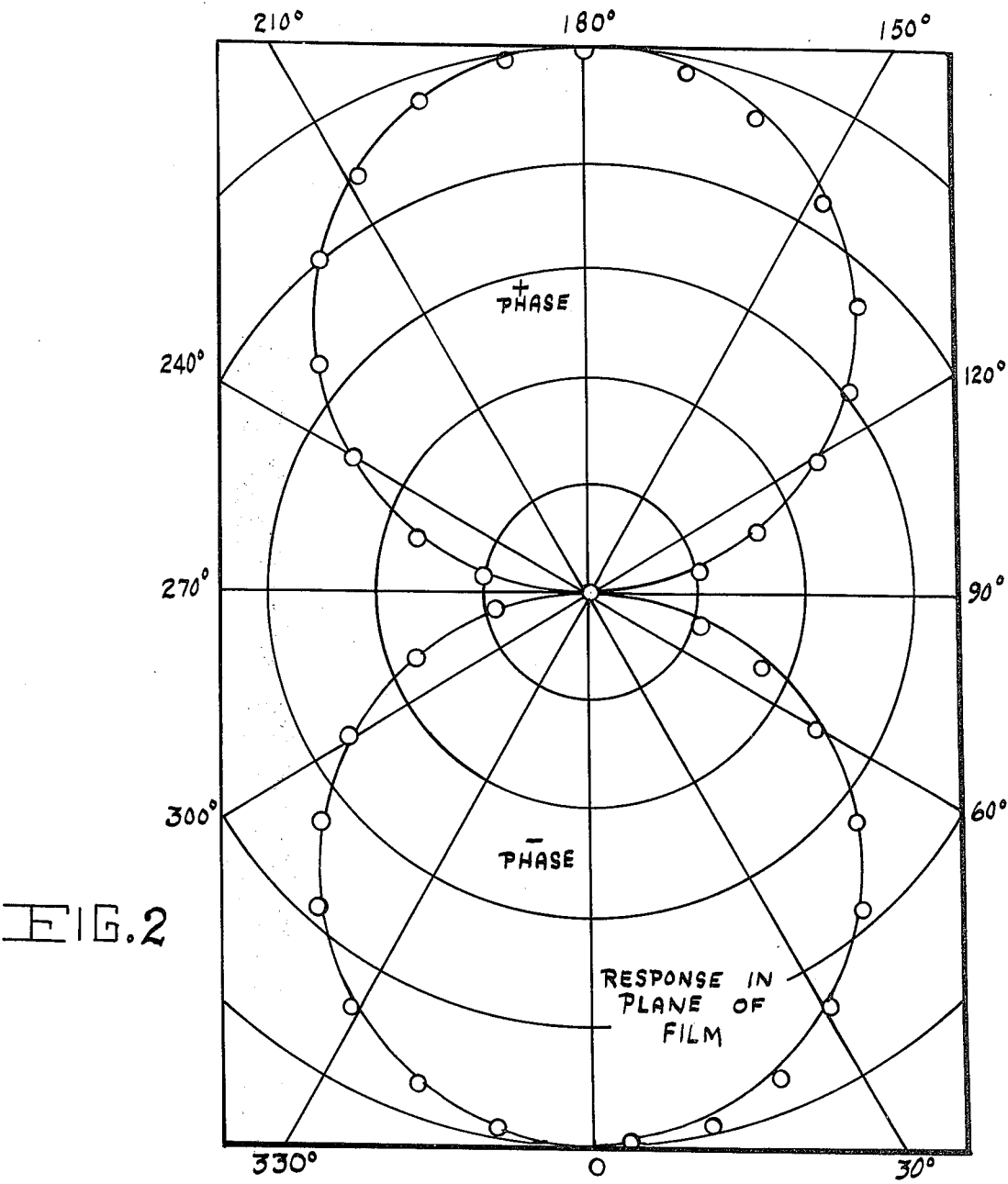
FIG. 2 is a graphical representation of the spatial response of the thin-film magnetic sensor.

Referring now to FIG. 1, there is shown a thin film magnetrometer sensor with a spatial field response which obeys a cosine $\theta$ law. The thin-film magnetrometer sensor 10 has a thin magnetic film 12 of permalloy material which is deposited upon an inert substance 14. The thin-film magnetometer has a pumping coil 16 and a signal coil 18 wound around the sensor in an orthogonal relationship to each other. There is shown super-imposed on the thin-film magnetometer sensor 10 an orthogonal coordinate system with the respective axis labeled $X$, $y$ and $z$. The pump winding coil 16 is shown wound in the $x$ direction while the signal winding coil 8 is shown wound in the $x$ direction 10 having a signal. In practice, an a-c current is applied to the pumping coil, inducing an a-c voltage at the output coil with amplitude varying as a function of the magnitude of the earth's magnetic field as projected on the axis of the sensor. FIG. 2 illustrates the spatial response in the plane of the film.

Figure 3:
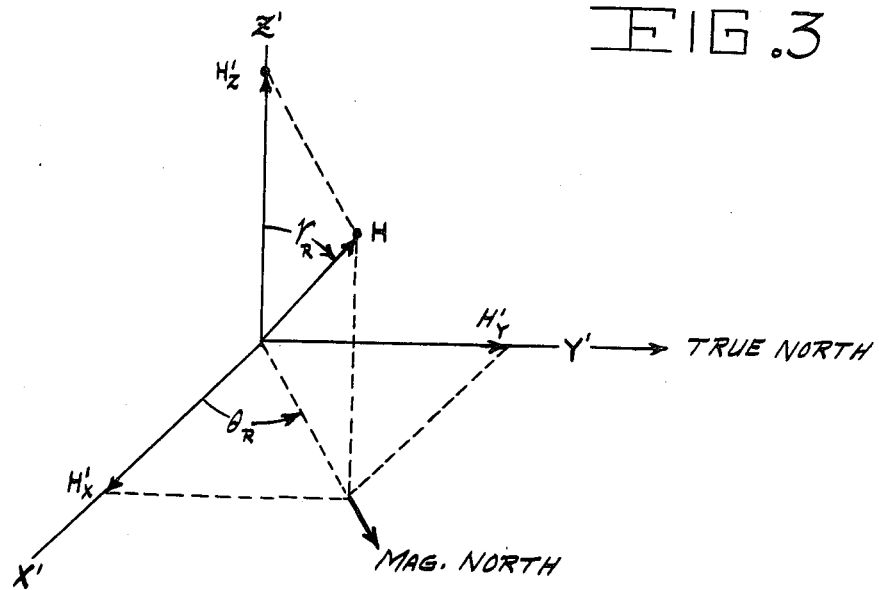
FIG. 3 is a graphic representation of the reference coordinate system.
Figure 4:
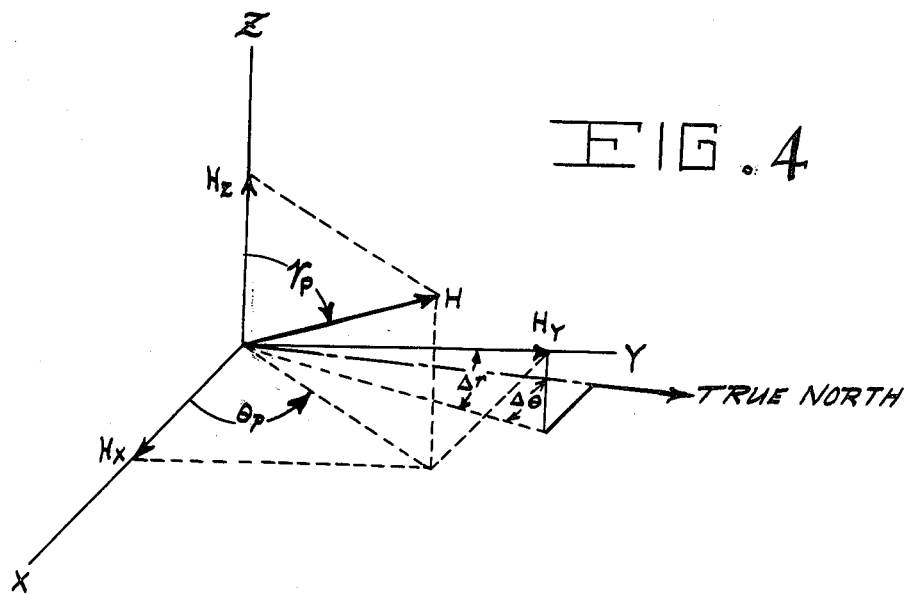
FIG. 4 is a graphical representation of the platform coordinate system.

FIG. 3 relates the orientation of three such sensors along the $x$, $y$, and $z$-axis of an orthogonal coordinate system. The H vector represents the earth's magnetic vector with position being defined by the angles $\gamma$ and $\theta$. The $x$, $y$-plane is assumed to be parallel to a plane tangent to the earth's surface with true north directed along the positive $y$-axis. FIG. 4 shows the coordinate system reoriented, introducing the alignment angles $\Delta\gamma$ and $\Delta\theta$ with respect to the reference coordinate system.

Figure 5:
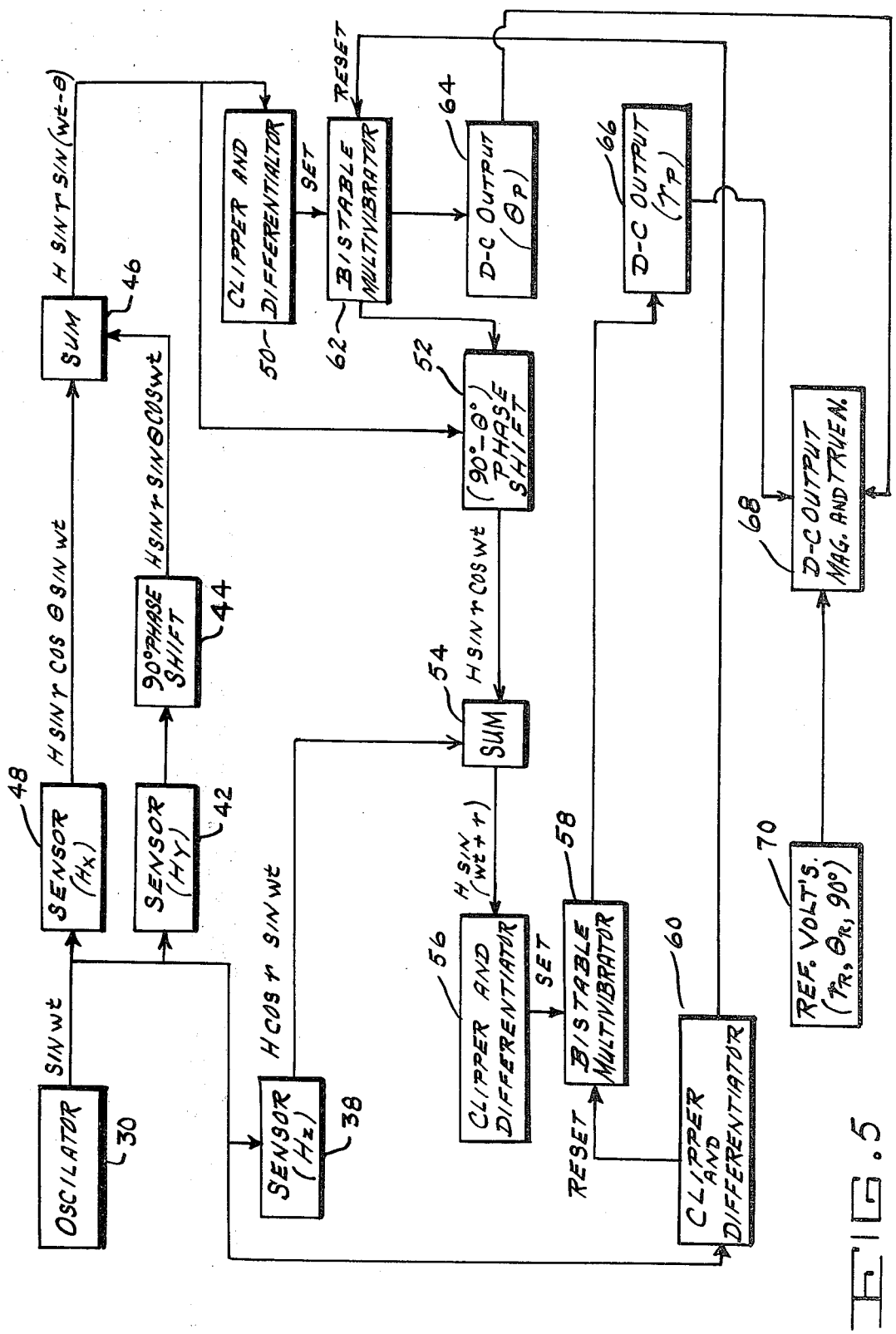
FIG. 5 is a block diagram of the thin-film magnetometer compass apparatus according to the present invention.

FIG. 5 presents a block diagram of electronic processing required for generation of the angular values defining the direction of true and/or magnetic north, parallel to the earth's surface, with reference to the platform coordinate system. An oscillating a-c current represented by sin wt, is applied by oscillator 30 to the input coil of each sensor 38, 42, 48 resulting in the following output voltages:

$H_x = H \sin \gamma \sin \theta \sin wt$
$H_y = H \sin \gamma \sin \theta \sin wt$
$H_z = H \cos \gamma \sin wt$ where $H_x$, $H_y$ and $H_z$ represent the components of the earth's magnetic field (H) along the axis of the three magnetometers. The 90° phase shift unit 44 provides a 90° phase shift of the $H_y$ signal, the $H_x$ and $H_y$ signals are summed in summing unit 46 to provide the following trigonometric identity:

H sin γ cos θ sin wt + H sin γ sin θ cos wt = H sin γ sin (wt + θ).

Both H sin γ sin (wt + θ) and the original signal sin wt, are clipped and differentiated in clipper and differentiator units 50, 60 respectively to produce a series of pulses with relative time spacing dependent upon θ. These pulse trains are then applied to a bistable multivibrator, 62 (flip-flop 62) with one series being applied to the set input and the other to the reset input. The output of flip-flop is applied to DC output unit 64 which then produces a d-c voltage that is linearly proportional to the value of θ. This is shown in FIGS. 6a-c as a function of various subharmonics.

There is a similar signal processing conducted with respect to γ. Picking up the H sin γ sin (wt + θ) signal from the summing unit 46 is shifted a (90°-θ) phase shift by phase shifter 52 and then the summing unit 54 sums the output of phase shifter 52 with the $H_z$ signal, H cos γ sin wt, to produce the necessary identity:

H cos γ sin wt + H sin γ cos wt = H sin (wt + γ) from which the value of γ is determined. Both the signal H sin ($ω_t$ + λ) and the original signal sin wt from oscillator 30 are clipped and differentiated in clipper and differentiator units 56 and 60 respectively to produce a series of pulses with a relative time spaced dependent upon λ. These resulting pulse trains are then applied to a bistable multivibrator 58 (flip-flop 58) with one series being applied to the set input and the other series to the reset input. The output of the flip-flop 58 is then applied to DC output unit 66 which then produces a DC voltage that is linearly proportional to the value of λ. The respective DC output signals from DC output units 64 and 66 are applied to DC output unit 68 wherein these signals are processed with a reference signal from reference unit 70 to produce the magnetic and true north indication.

The previously stored voltage values defining the local north vectors with respect to the reference coordinate system are then utilized as illustrated in Table 1 below.

TABLE I

| Voltage Reference : Processed $θ_{Rm}$, $γ_R$, 90 \| $θ_P$, $θ_R$ | | |
|---|---|---|
| TEST | COORDINATE Mag. North | ROTATION True North |
| $θ_P - θ_R = 0$ | .0 | $90 - θ_R$ |
| $θ_P - θ_R$  0 | $+Δθ$ | $90 - θ_R + Δθ$ |
| $θ_P - θ_R$  0 | $-Δθ$ | $90 - θ_R - Δθ$ |
| $γ_P - γ_R = 0$ | 0 | $90 - γ_R$ |
| $γ_P - γ_R$  0 | $+Δγ$ | $90 - γ_R + Δγ$ |
| $γ_P - γ_R$  0 | $-Δγ$ | $90 - γ_R - Δγ$ | where $Δθ = θ_P - θ_R$ and $Δγ + γ_P - γ_R$.
This is turn defines the north vectors with respect to the platform coordinate system. If redundancy is desirable, the process may be repeated by redefining the angles γ and θ with respect to the y and z-axis and/or z and x-axis, and the H vector.

There is shown in FIG. 7 a calibration curve of the thin-film magnetometer compass discussed earlier. The maximum deviation from linearity (dashed locus) is approximately ± 15°, with a transition from full d-c voltage to zero d-c voltage (i.e., 360°) of about 15°. With circuitry refinement these errors can be reduced. In addition, analysis of error inducement as a function of platform latitude and altitude deviation from local inclination-declination references are required. The established sensitivity range of the thin-film magnetometer fully encompasses the magnitude of the earth's magnetic field, presenting no problems.

Although the invention has been described with reference to a particular embodiment, it will be understood to those skilled in the art that the invention is capable of a variety of alternative embodiments within the spirit and scope of the appended claims.

What is claimed is:

1. A thin-film magnetometer compass apparatus having total tilt immunity comprising in combination:

a plurality of thin-film magnetometer sensors arranged on a platform coordinate system in orthogonal relationship to each other, said plurality of thin-film magnetometer sensors are rigidly mounted with respect to said platform coordinate system, each of said plurality of thin-film magnetometers receiving an input signal, each of said plurality of thin-film magnetometer sensors providing an output signal respectively, said output signals having a varying amplitude, said amplitude varying as a function of the magnitude of the earth's magnetic field, and means for computing the north vectors receiving each of said output signals and said input signal, said computing means processing said output signals with respect to each other and with respect to said input signal to define platform angular deviation, said computing means providing a first and second DC voltage representing said platform angular deviation, said computing means comparing said first and second DC voltage with magnetic and true north reference voltages to provide the angular deviations with respect to magnetic and true north respectively.

2. A thin-film magnetometer compass apparatus as described in claim 1 wherein said plurality of thin-film magnetometer sensors comprises a first, second and third magnetometer unit mutually orthogonal to each other.

3. A thin-film magnetometer compass apparatus as described in claim 2 wherein said thin-film magnetometer units have a first and second coil wound thereon, said first coil comprises a pumping coil to receive said input signal, said second coil comprises an output coil to produce said output signal.

4. A thin-film magnetometer compass apparatus as described in claim 3 wherein said pumping coil and said output coil are orthogonal to each other.

5. A thin-film magnetometer compass apparatus as described in claim 4 wherein said output signal defines the orientation of said output coil with respect to the earth's magnetic field.

6. A thin-film magnetometer compass apparatus as described in claim 2 wherein said computing means comprises in combination a first summing unit to receive the first output signal from said first thin-film magnetometer sensor, a first phase shift unit receiving the second output signal from said second thin-film magnetometer sensor, said first phase shift unit having a shift predetermined phase shift, said first phase shift unit having a fourth output signal, said fourth output signal being applied to said first summing unit, said first summing unit summing said fourth output signal and said first output signal of said first thin-film magnetometer sensor to provide a summed output signal, a first logic means receiving said summed output signal, said first logic means providing a fifth output signal proportional to said summed output signal.

a second phase shift unit receiving said summed output signal from said first summing unit, said second phase shift unit receiving said fifth output signal from said first logic means, said second phase shift unit having a second predetermined phase shift, said second phase shift unit combining and shifting said summed output signal and said fifth output signal from first logic means to provide a sixth output signal.

said second summing means combining the third output signal of said third thin-filmed magnetometer sensor and said sixth output signal to provide a seventh output signal, a second logic means receiving said input signal, said second logic means providing an eighth output signal, a first DC output unit to receive said fifth output signal from said first logic means, said first DC output means providing a ninth output signal, said output signal representing said first platform angular deviation.

a second DC output unit to receive said eighth output signal, said second DC output unit providing a tenth output signal, said tenth output signal representing said second plate from angular deviation, and a third DC output unit receiving said eighth and ninth output signals, said third DC output unit receiving a reference voltage, said third DC output unit comparing said reference voltage with said eight and ninth output signal, said third output unit providing an eleventh output signal, said eleventh output signal representing the angular deviation with respect to magnetic and true north.

7. A thin-film magnetometer compass apparatus as described in claim 6 wherein said first predetermined phase shift equals 90°.

8. A thin-film magnetometer compass apparatus as described in claim 6 wherein said second predetermined phase shift equals $(90°-\theta_R \phi)$.

* * * * *